United States Patent [19]
Lord et al.

[11] 4,396,943
[45] Aug. 2, 1983

[54] VIDEO FLOWMETER

[76] Inventors: David E. Lord; Gary W. Carter; Richard R. Petrini, all of Livermore, Calif., granted to U.S. Department of Energy under the provisions of 42 U.S.C. 2182

[21] Appl. No.: 272,228

[22] Filed: Jun. 10, 1981

[51] Int. Cl.³ .............................................. H04N 7/18
[52] U.S. Cl. ...................................... 358/107; 356/28
[58] Field of Search ........................... 358/107; 356/28

[56] References Cited
U.S. PATENT DOCUMENTS

| | | | |
|---|---|---|---|
| 3,457,419 | 7/1969 | Rosa | 250/217 |
| 3,547,540 | 12/1967 | Shigemoto | 356/28 |
| 3,832,059 | 8/1974 | Iten | 356/28 |
| 3,941,477 | 3/1976 | Schodl | 356/28 |
| 4,099,870 | 7/1978 | Luzzi | 356/28 |
| 4,206,999 | 6/1980 | Keller | 356/28 |

FOREIGN PATENT DOCUMENTS 954629  4/1964  United Kingdom .

OTHER PUBLICATIONS

Lord, Carter and Petrini, "Flow Observation by Rod Lens and Low-Light Video", *Lawrence Livermore National Laboratory Report* UCRL-52324 (1977).
Carter, "A Unique Rod Lens/Video System Designed to Observe Flow Conditions in Emergency Core Coolant Loops of Pressurized Water Reactors", *Lawrence Livermore National Laboratory Report* UCRL-52902 (1979).
Berci, "A New Approach in Optics-The Hopkins 'Rod-Lens' System", *Proceedings of the 15th Annual Technical Symposium of the Society of Photo-Optical Instrumentation Engineers*, Sep. 14-17, 1970, Anaheim, Calif.
Lord and Spataro, "Development of a Video Multiphase Flowmeter for On-Line Process Control", *Lawrence Livermore National Laboratory Report* LLL--PROPOSAL-171 (1980).

*Primary Examiner*—Howard Britton
*Attorney, Agent, or Firm*—Gary C. Roth; L. E. Carnahan; Richard G. Besha

[57] ABSTRACT

A video flowmeter is described that is capable of specifying flow nature and pattern and, at the same time, the quantitative value of the rate of volumetric flow. An image of a determinable volumetric region within a fluid (10) containing entrained particles (12) is formed and positioned by a rod optic lens assembly (31) on the raster area of a low-light level television camera (20). The particles (12) are illuminated by light transmitted through a bundle of glass fibers (32) surrounding the rod optic lens assembly (31). Only particle images having speeds on the raster area below the raster line scanning speed may be used to form a video picture which is displayed on a video screen (40). The flowmeter is calibrated so that the locus of positions of origin of the video picture gives a determination of the volumetric flow rate of the fluid (10).

8 Claims, 4 Drawing Figures

VIDEO FLOWMETER

BACKGROUND OF THE INVENTION

The United States Government has rights in this invention pursuant to Contract No. W-7405-ENG-48 between the United States Department of Energy and the University of California for the performance of research and development work at the Lawrence Livermore National Laboratory.

The invention described herein relates generally to method and apparatus involving flowmeters, and more particularly to flowmeters in which rod optics and video techniques are used to observe and measure fluid flow.

Most flowmeters produce a single electrical signal from which must be inferred the rate of volumetric flow. If the actual nature of the flow is different from that assumed, the inferred flow rate will be in error. In attempts to ascertain flow nature directly, flow has previously been observed and recorded by high-speed photography through transparent glass or plastic pipe sections. This method is limited by pipe strength deficiencies to use under mild pressure and temperature conditions. The method is further limited by disadvantages inherent in film processing, such as the delay caused by the time required for film development and the blurring of dynamic events caused by long exposure time requirements.

Fluid flow has been observed through endoscope or rod lens systems inserted into the wall of the pipe section through which the fluid is flowing. Such systems have been described by D. E. Lord, G. W. Carter, and R. R. Petrini in "Flow Observation by Rod Lens and Low-Light Video", Lawrence Livermore National Laboratory Report Number UCRL-52324, dated Aug. 10, 1977, and by Gary W. Carter in "A Unique Rod Lens/Video System Designed to Observe Flow Conditions in Emergency Core Coolant Loops of Pressurized Water Reactors", Lawrence Livermore National Laboratory Report Number UCRL-52902, dated Dec. 28, 1979. Rod lenses, which are manufactured by the Storz Company of West Germany, are discussed by G. Berci in "A New Approach in Optics -- The Hopkins 'Rod-Lens' System", published in "Proceedings of the 15th Annual Technical Symposium of the Society of Photo-Optical Instrumentation Engineers, Sept. 14-17, 1970, Anaheim, California." Rod lenses are disclosed in British Pat. No. 954,629 to H. H. Hopkins, published Apr. 8, 1964. When used to observe fluid flow, the rod lens has usually been surrounded by a built-in bundle of glass fibers which is used to transmit light into the pipe for object illumination. Rod lenses coupled to low-light level television cameras with high light intensity gains have demonstrated themselves to be quite capable of satisfactorily recording dynamic flow.

Even though flow nature and pattern may be determined by direct rod lens-video system observation, this method does not presently solve the problem of specifying the quantitative value of the actual rate of volumetric flow.

SUMMARY OF THE INVENTION

It is therefore an object of the invention to provide a flowmeter.

Another object of the invention is to provide a flowmeter capable of determining flow nature and pattern, and at the same time also capable of specifying the quantitative value of the actual rate of volumetric flow.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly point out in the appended claims.

To achieve the foregoing and other objects, and in accordance with the purpose of the present invention, as embodied and broadly described herein, the method and apparatus involving flowmeters of this invention may comprise measuring the volumetric flow rate of a fluid in which particles are entrained by positioning an image of a determinable volumetric region within the fluid on the raster area of a television camera. The determinable volumetric region is adjusted so that the speeds of particle images on the raster area vary from values above to values below the raster line scanning speed. Only particle images having speeds on the raster area below the raster line scanning speed may be used to form a video picture which is displayed on a video screen. The system is calibrated so that the locus of positions of origin of the video picture yields a determination of the volumetric flow rate of the fluid.

Preferably, the image of the determinable volumetric region within the fluid is formed and positioned by a rod optic lens assembly coupled to the television camera. It is also preferred that the particles in the fluid be illuminated by light transmitted through a bundle of glass fibers surrounding the rod optic lens assembly, and that the television camera be a low-light level television camera.

The benefits and advantages of the present invention, as embodied and broadly described herein, include, inter alia, being able with a single piece of apparatus to determine the nature and pattern of fluid flow and, at the same time, being able to specify the actual volumetric flow rate of that flow.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figures 1, 1A:
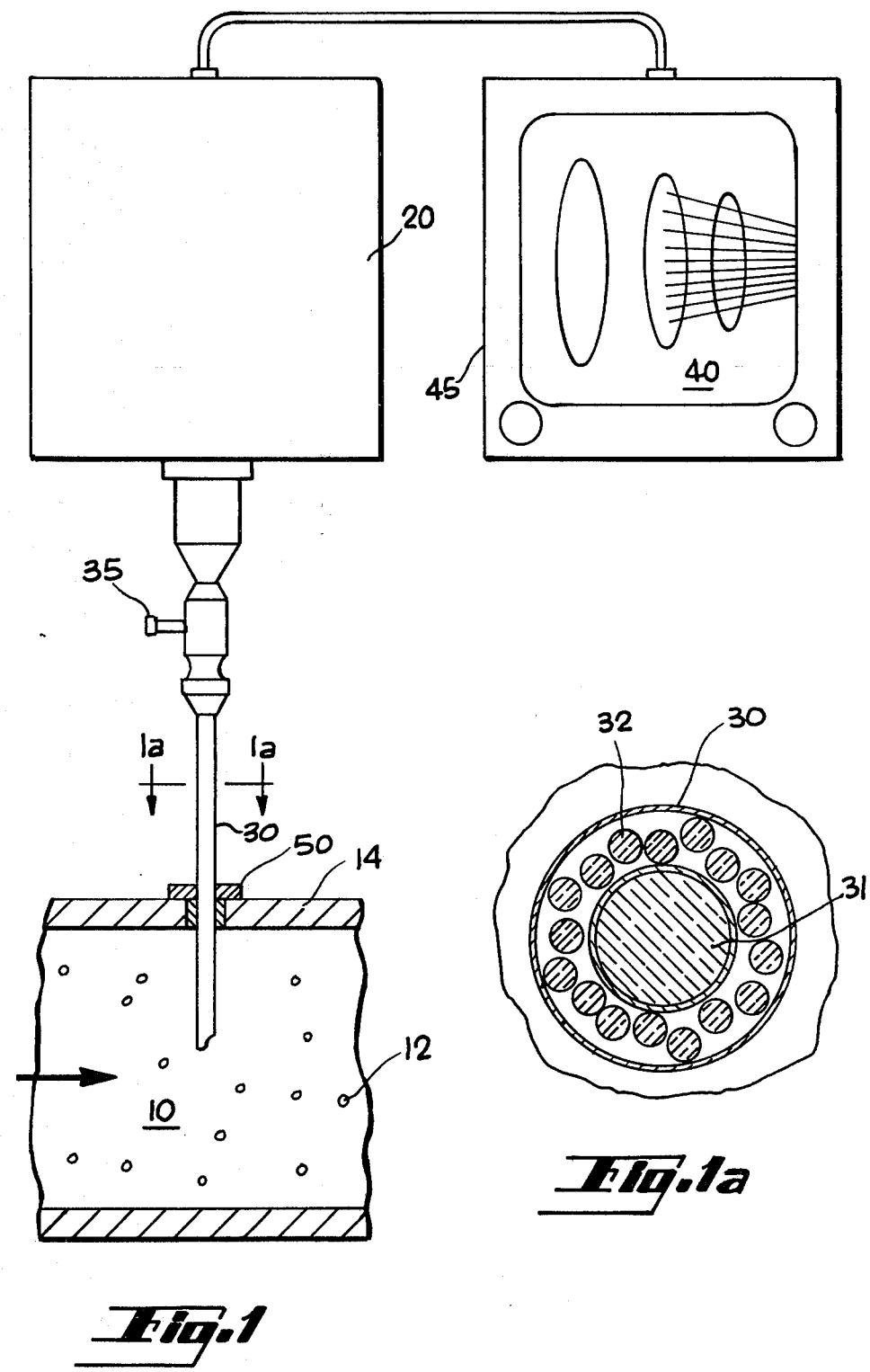
FIG. 1 is a schematic illustration of a video flowmeter in accordance with the present invention, showing: a fluid in which particles are entrained flowing in a pipe; a positionally adjustable rod optic lens assembly surrounded by a bundle of glass fibers and coupled to a low-light level television camera; and a video screen display.
FIG. 1A is a schematic cross sectional view of the rod optic lens assembly surrounded by a bundle of glass fibers of FIG. 1, taken along the line 1A—1A in FIG. 1.

Reference will now be made in detail to the present preferred embodiment of the invention, an example of which is illustrated in the accompanying drawings. FIG. 1 illustrates a video flowmeter for measuring the rate of volumetric flow of a transparent fluid 10, in which particles 12 are entrained, flowing in a pipe 14. Means are provided for positioning an image of a determinable volumetric region within fluid 10 on the raster area of a television camera 20. Preferably, such means includes a rod optic lens assembly coupled to television camera 20. Preferably, the rod optic lens assembly is surrounded by a bundle of glass fibers through which light, introduced at light input connector 35, is transmitted to illuminate particles 12. The rod optic lens assembly surrounded by a bundle of glass fibers 30, is shown in cross section in FIG. 1A, taken along the line 1A—1A in FIG. 1. Individual glass fibers 32 surround rod optic lens assembly 31. The optical system comprising a rod optic lens assembly surrounded by a bundle of glass fibers can be as small as 0.15 cm in diameter and 10 cm long, or as large as 2.5 cm in diameter and 1,000 cm long. The individual glass fibers are usually about 0.002 inches in diameter and used in sufficient number to transmit light as required. Returning to FIG. 1, it is further preferable that television camera 20 be a low-light level television camera. A video picture formed by television camera 20 is displayed on video screen 40 of television monitor 45. Means are provided for adjusting the determinable volumetric region within fluid 10. Preferably, such means includes sliding and rotating rod optic lens assembly surrounded by a bundle of glass fibers 30 within pressure fitting 50. As will be explained hereinbelow, except for the production of random flashes of light, only particle images having speeds less than the raster line scanning speed, on the television camera 20 raster area, can be used to form the video picture displayed on video screen 40. Consequently, the locus of positions of origin of the video picture displayed on video screen 40 is indicative of the rate of volumetric flow of fluid 10. Therefore, the video flowmeter of FIG. 1 can be calibrated, through the observation of known volumetric flow rates, to thereafter give quantitative volumetric flow rate information in subsequent situations of on-line use. The video flowmeter can be calibrated to measure the volumetric flow rate of flow of various natures such as, inter alia, laminar, wavy, stratified, or annular. The flowmeter can accommodate flow patterns containing bubbles, solid plugs, or slugs. The entrained particles 12 may comprise drops, bubbles, solid particles, or combinations thereof. If no particles normally exist in fluid 10, bubbles can be generated in liquid by a heater wire, or drops can be generated in vapor by a cold-tube insert.

Figure 2:
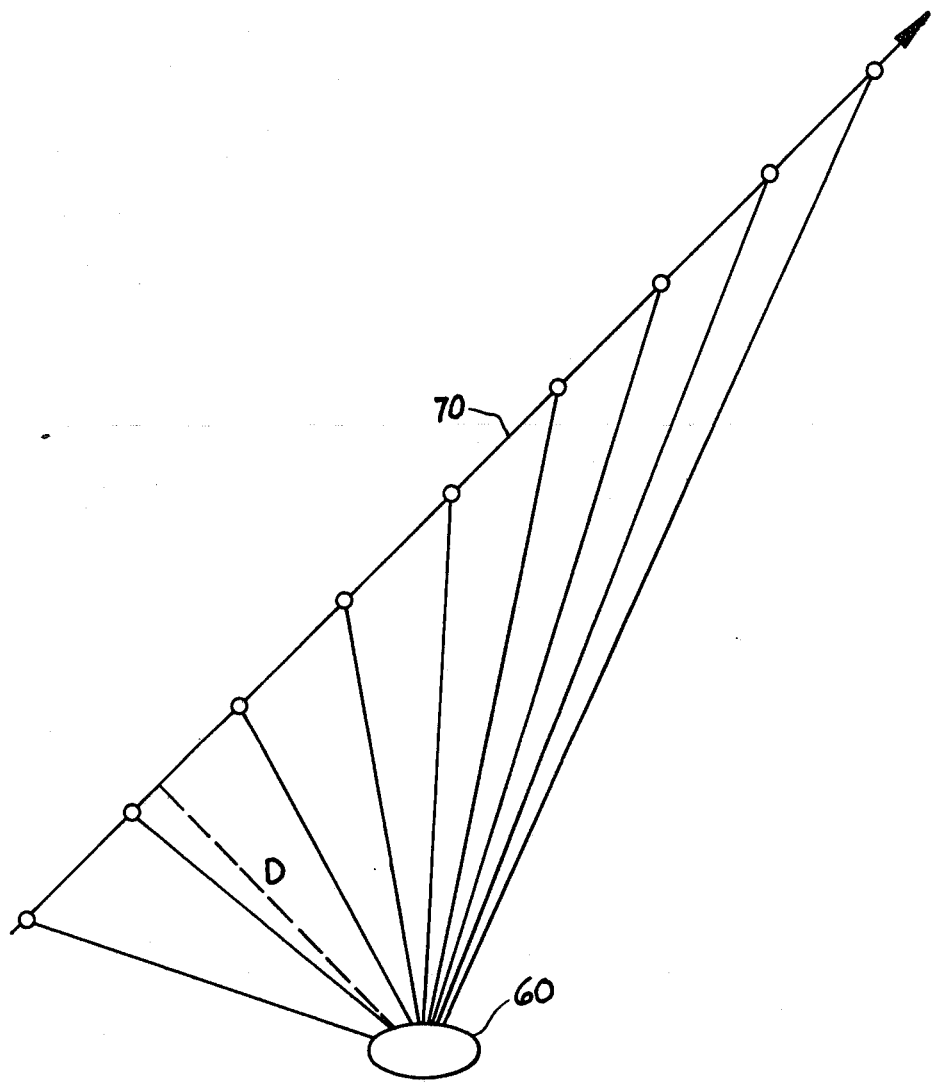
FIG. 2 is a schematic representation showing the variation in the angle swept out in equal time intervals by a particle of constant velocity as observed through the objective lens of the rod optic lens assembly of FIG. 1.

Reference is now made of FIG. 2 which schematically shows the end or objective lens 60 of the rod optic lens assembly 31 of FIG. 1A. Also shown is particle trajectory 70 of a particle of constant velocity which passes lens 60 at the perpendicular distance D. Trajectory 70 is divided into segments of equal length, each of which represents the distance traveled by the particle in an arbitrary equal time interval. In each equal time interval, the particle sweeps out an angle with respect to lens 60. This angle maximizes at the point of closest approach of the particle to lens 60, and becomes ever smaller as the particle recedes from lens 60. Because of this effect, the constant velocity entrained particles 12 viewed from a downstream perspective by the video flowmeter of FIG. 1 appear as particle images that progressively slow down as they proceed across the raster area of television camera 20.

Figure 3:
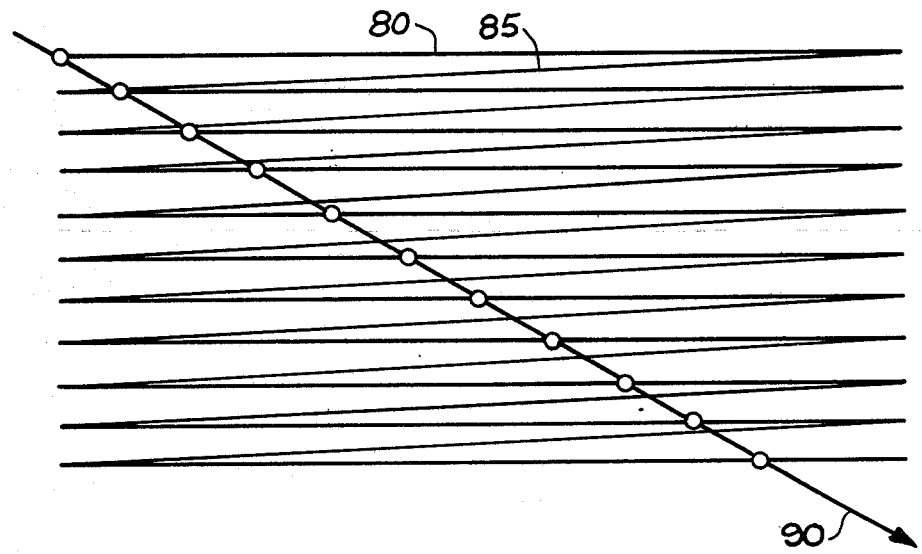
FIG. 3 is a schematic representation showing a constant velocity particle image precisely in step with the scan lines on the raster area of a television camera, to illustrate situations wherein particles can and cannot be video-imaged by the flowmeter of FIG. 1.

Reference is now made to FIG. 3 which represents the raster area of a television camera, such as television camera 20 of FIG. 1. The video scan lines 80 and the video retrace lines 85, for a single field, are shown. In standard television systems, double interlaced scanning is used. This means that the odd-numbered scan lines are scanned first, giving a first field, and that the even-numbered scan lines are scanned second, giving a second field. The two fields make up a single frame, and the process is repeated. It is usual for the single field time to be 1/60 second, and the frame time to be 1/30 second, but this may be varied. FIG. 3 also shows the trajectory 90 of a particle image which is precisely in step with scan lines 80. In the situation depicted, a video picture is just formed in one field. It is convenient to define the raster line scanning speed as the diagonal dimension of a raster divided by the single field time. Thus, if a raster has the diagonal dimension of 20 cm and the single field time of 1/60 sec, the raster line scanning speed is 1200 cm/sec, or 12 meters/sec. If the single field time is reduced by the factor eight, as is possible with commercially available video cameras, to 1/480 sec, the raster line scanning speed becomes 96 meters/sec. If a particle image on a raster area has a speed at or below the raster line scanning speed, a video picture may be formed of the particle. Video picture formation does not occur in every such situation. However, the probability of video picture formation greatly increases as particle image raster area speed decreases below the raster line scanning speed. On the other hand, if a particle image on the raster area has a speed above the raster line scanning speed, a video picture of the particle, other than as a random flash of light, cannot be formed.

When the video flowmeter of FIG. 1 is used, the determinable volumetric region within fluid 10 is adjusted until the video picture displayed on video screen 40 shows particles which seem to appear, or originate, in mid-screen, and thereafter proceed progressively slowly across the video screen. The locus of the positions of origin of the particle trajectories is directly indicative of the volumetric flow rate of fluid 10. If the system is calibrated using known volumetric flow rates combined with flows of various natures, the video flowmeter may be subsequently used to give volumetric flow rate information during on-line use. A microprocessor can be used in conjunction with the calibration to display flow rate information directly on the video picture. For example an overlay, similar to those of electronic games popularly in use with home television receivers, consisting of a series of colored grids, each indicative of a different flow rate, could be prepared and input directly onto video screen 40. If a densitometer is used in conjunction with the video flowmeter, mass flow rates may be calculated.

It will thus be appreciated that a video flowmeter capable of determining flow nature and pattern, and at the same time also capable of specifying the quantitative value of the actual rate of volumetric flow is provided.

The foregoing description of a preferred embodiment of the invention has been presented for purposes of illustration and description. It is not intended to be exhaustive or to limit the invention to the precise form disclosed, and many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of measuring the flow rate of a fluid in which particles are entrained, comprising the steps of:
   positioning an image of a determinable volumetric region within said fluid on a raster area of a television camera;
   scanning said image with a scanning raster having a known raster line scanning speed;
   adjusting said determinable volumetric region to achieve a situation wherein the speeds of particle images on said raster area vary from values above to values below said known raster line scanning speed, so that only particle images having speeds on said raster area below said known raster line scanning speed can be used to form a video picture;
   displaying said video picture on a video screen; and
   obtaining said flow rate from the locus of positions of origin of said video picture.

2. The method of claim 1, wherein:
   said positioning step includes the step of utilizing a rod optic lens assembly coupled to said television camera.

3. The method of claim 2, wherein:
   said positioning step includes the step of utilizing a bundle of glass fibers surrounding said rod optic lens assembly, for transmitting light to illuminate said particles.

4. The method of claim 3, wherein:
   said positioning step is carried out by utilizing a low-light level television camera.

5. Apparatus for measuring the flow rate of a fluid in which particles are entrained, which comprises:
   a television camera forming a video picture and having a raster area and a scanning raster of known raster line scanning speed;
   a video screen displaying said video picture;
   means for positioning an image of a determinable volumetric region within said fluid on said raster area;
   means for adjusting said determinable volumetric region to achieve a situation wherein the speeds of particle images on said raster area vary from values above to values below said known raster line scanning speed, so that only particle images having speeds on said raster area below said known raster line scanning speed are used to form said video picture so that the locus of positions of origin of said video picture determines said flow rate.

6. Apparatus, as recited in Claim 5, wherein:
   said positioning means and said adjusting means comprise a rod optic lens assembly coupled to said television camera.

7. Apparatus, as recited in claim 6, wherein:
   said positioning means further comprises a bundle of glass fibers surrounding said rod optic lens assembly, for transmitting light to illuminate said particles.

8. Apparatus, as recited in claim 7, wherein:
   said television camera is a low-light level television camera.

* * * * *